US011178684B2

(12) United States Patent
Takeda et al.

(10) Patent No.: US 11,178,684 B2
(45) Date of Patent: Nov. 16, 2021

(54) TERMINAL AND RADIO COMMUNICATION METHOD FOR SCHEDULING A DOWNLINK SHARED CHANNEL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 153 days.

(21) Appl. No.: 16/489,945

(22) PCT Filed: Mar. 2, 2017

(86) PCT No.: PCT/JP2017/008373
§ 371 (c)(1),
(2) Date: Aug. 29, 2019

(87) PCT Pub. No.: WO2018/158923
PCT Pub. Date: Sep. 7, 2018

(65) Prior Publication Data
US 2020/0236698 A1 Jul. 23, 2020

(51) Int. Cl.
*H04W 72/12* (2009.01)
*H04L 1/18* (2006.01)
(Continued)

(52) U.S. Cl.
CPC ....... *H04W 72/1273* (2013.01); *H04L 1/1819* (2013.01); *H04L 5/0055* (2013.01); *H04W 72/042* (2013.01); *H04W 72/0446* (2013.01)

(58) Field of Classification Search
CPC ........... H04W 72/1273; H04W 72/042; H04W 72/0446; H04W 72/0406; H04W 28/04;
(Continued)

(56) References Cited

U.S. PATENT DOCUMENTS

2017/0367046 A1* 12/2017 Papasakellariou .... H04L 5/0053
2018/0019843 A1* 1/2018 Papasakellariou ...........................
H04W 72/0406
2019/0238275 A1* 8/2019 Sun ..................... H04W 72/042

OTHER PUBLICATIONS

Extended European Search Report issued in counterpart European Patent Application No. 17898698.0, dated Oct. 28, 2020 (9 pages).
(Continued)

*Primary Examiner* — Walli Z Butt
(74) *Attorney, Agent, or Firm* — Osha Bergman Watanabe & Burton LLP

(57) ABSTRACT

The present invention is designed so that DL data can be received, and HARQ-ACK can be transmitted, properly, even when different data scheduling methods than existing LTE systems are used. According to one aspect of the present invention, a user terminal has a receiving section that receives DL control information, and a control section that controls receipt of DL data scheduled by the DL control information, and transmission of delivery acknowledgment information in response to the DL data, and the DL control information indicates a relationship between the timing of receiving the DL control information, the timing of receiving the DL data, and the timing of transmitting the delivery acknowledgment information, and the control section determines, based on the DL control information, the timing of receiving the DL data and the timing of transmitting the delivery acknowledgment information.

9 Claims, 13 Drawing Sheets

(51) Int. Cl.
*H04L 5/00* (2006.01)
*H04W 72/04* (2009.01)

(58) Field of Classification Search
CPC .... H04W 72/04; H04L 1/1819; H04L 5/0055; H04L 1/189; H04L 1/1864; H04L 1/1854
See application file for complete search history.

(56) References Cited

OTHER PUBLICATIONS

Samsung; "DCI Formats and Contents for NR"; 3GPP TSG RAN WG1 #88, R1-1702975; Athens, Greece; Feb. 13-17, 2017 (5 pages).
Fraunhofer HHI; "HARQ timing and number of HARQ processes for NR"; 3GPP TSG-RAN WG1#88, R1-1703330; Athens, Greece; Feb. 13-17, 2017 (3 pages).
Huawei, HiSilicon; "Scheduling scheme for slot aggregation"; 3GPP TSG RAN WG1 Meeting #87, R1-1611662; Reno, USA; Nov. 14-18, 2016 (4 pages).
International Search Report issued in PCT/JP2017/008373 dated May 23, 2017 (2 pages).
Written Opinion of the International Searching Authority issued in PCT/JP2017/008373 dated May 23, 2017 (4 pages).
Nokia, Alcatel-Lucent Shanghai Bell; "On HARQ/scheduling timing and self-contained operation"; 3GPP TSG-RAN WG1 #86 Bis, R1-1609742; Lisbon, Portugal; Oct. 10-14, 2016 (7 pages).
MediaTek Inc.; "Views on Remaining Issues for NR Frame Structure"; 3GPP TSG RAN WG1 Meeting #86bis, R1-1609554; Lisbon, Portugal; Oct. 10-14, 2016 (8 pages).
ZTE, ZTE Microelectronics; "On Indicating HARQ and PUCCH"; 3GPP TSG-RAN WG1 Meeting #86bis, R1-1608958; Lisbon, Portugal; Oct. 10-14, 2016 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in the counterpart Korean Patent Application No. 10-2019-7027079, dated Mar. 20, 2021 (10 pages).
Office Action issued in the counterpart Japanese Patent Application No. 2019-502396, dated Mar. 16, 2021 (8 pages).
Samsung; "Slot Aggregation"; 3GPP TSG RAN WG1 NR AH, R1-1702992; Spokane, USA, Jan. 16-20, 2017 (3 pages).
CMCC; "Further Discussion on DCI in NR"; 3GPP TSG RAN WG1 Meeting #88, R1-1703408; Athens, Greece, Feb. 13-17, 2017 (6 pages).

* cited by examiner

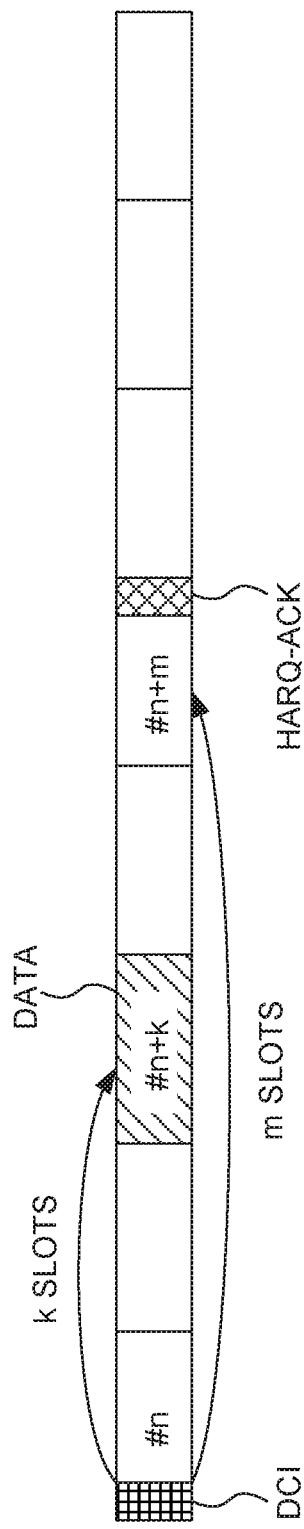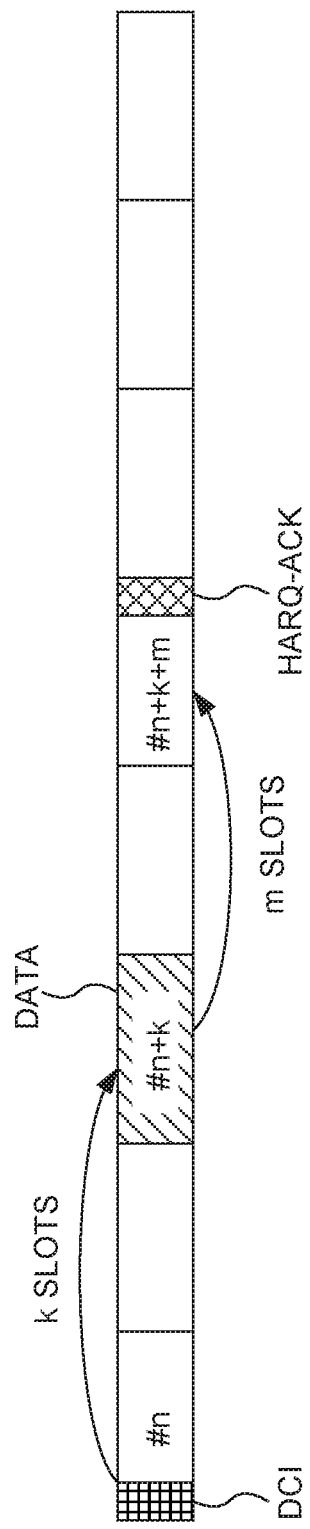

FIG. 3A

| k | A |
|---|---|
| 0 | 00 |
| 1 | 01 |
| 2 | 10 |
| 3 | 11 |

FIG. 3B

| m | B |
|---|---|
| 0 | 00 |
| 1 | 01 |
| 2 | 10 |
| 3 | 11 |

FIG. 3C

| k | m | C |
|---|---|---|
| 0 | 0 | 000 |
| 1 | 1 | 001 |
| 2 | 2 | 010 |
| 3 | 3 | 011 |
| 0 | 1 | 100 |
| 1 | 2 | 101 |
| 2 | 3 | 110 |
| 3 | 4 | 111 |

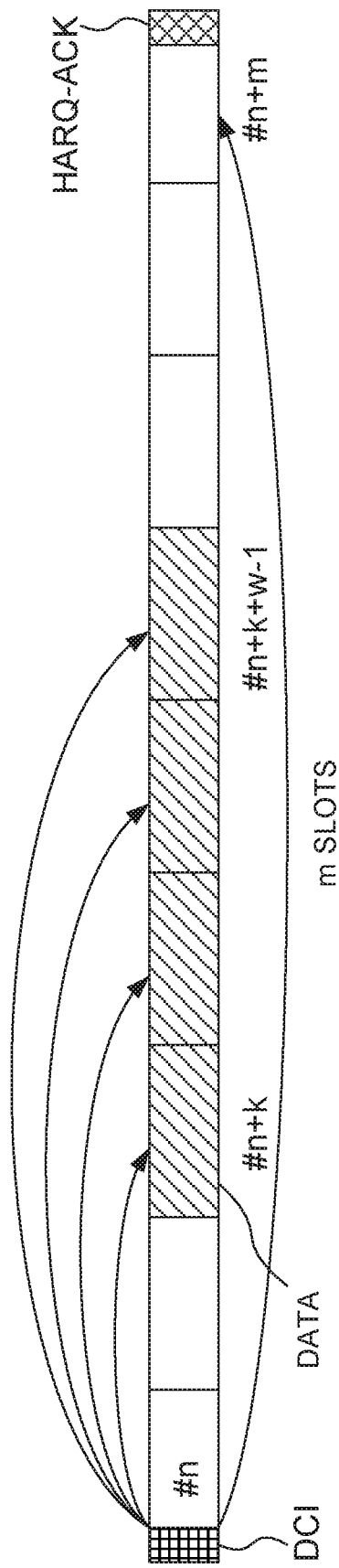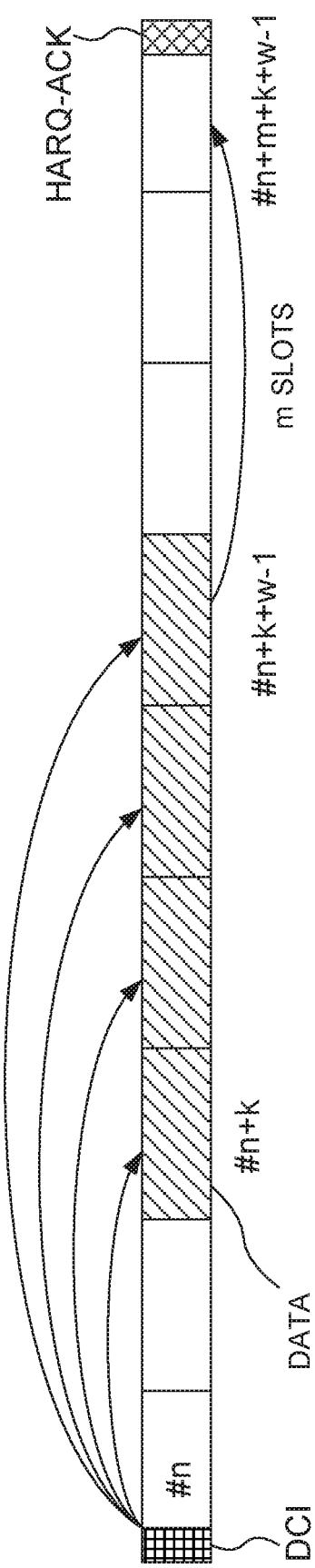

| k | m | w | D |
|---|---|---|---|
| 0 | 0 | 1 | 000 |
| 1 | 1 | 1 | 001 |
| 0 | 1 | 1 | 010 |
| 1 | 2 | 1 | 011 |
| 0 | 0 | 2 | 100 |
| 1 | 1 | 2 | 101 |
| 0 | 1 | 2 | 110 |
| 1 | 2 | 2 | 111 |

FIG. 7

TERMINAL AND RADIO COMMUNICATION METHOD FOR SCHEDULING A DOWNLINK SHARED CHANNEL

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

A radio base station controls the allocation (scheduling) of data for a user terminal, and reports the schedule of the data to the user terminal (for example UE (User Equipment)) using downlink control information (DCI). The user terminal controls receipt of DL data and transmission of uplink data based on the downlink control information. For example, in the existing LTE system, when the user terminal receives downlink control information for commanding UL transmission (for example, UL grant), the user terminal transmits uplink data in a subframe after a predetermined period (for example, after 4 ms).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rel. 14, 15 or later versions, 5G, NR, etc.) are assumed to control data scheduling based on different configurations than existing LTE systems (for example, LTE Rel. 13 or earlier versions).

For example, in existing LTE systems, DL data in each subframe is scheduled based on downlink control information that is transmitted per predetermined transmission time interval (subframe). Also, based on downlink control information transmitted in a given subframe, UL data is scheduled a predetermined period later. By contrast with this, future radio communication systems are under research to use downlink control information that is transmitted in a given transmission time interval (for example, a slot) to control scheduling of data (UL data and/or DL data) in this same slot and/or in different slots. Note that controlling data scheduling in different slots based on downlink control information in a predetermined slot is also referred to as "cross-slot scheduling."

When cross-slot scheduling is used, the problem lies in how to control the timing of DL data and the timing of HARQ-ACK in response to the DL data. The problem in controlling the timing of DL data and HARQ-ACK is how to let the user terminal determine the timing of DL data and HARQ-ACK.

The present invention has been made in view of the above, and it is therefore an object of the present invention to provide a user terminal and radio communication method, whereby data can be transmitted and/or received adequately even when data scheduling methods that are different from those of existing LTE systems are applied.

Solution to Problem

According to one aspect of the present invention, a user terminal has a receiving section that receives DL control information, and a control section that controls receipt of DL data scheduled by the DL control information, and transmission of delivery acknowledgment information in response to the DL data, and the DL control information indicates a relationship between the timing of receiving the DL control information, the timing of receiving the DL data, and the timing of transmitting the delivery acknowledgment information, and the control section determines, based on the DL control information, a timing of receiving the DL data and a timing of transmitting the delivery acknowledgment information.

Advantageous Effects of Invention

According to the present invention, data can be transmitted and/or received adequately even when data scheduling methods that are different from those of existing LTE systems are applied.

BRIEF DESCRIPTION OF DRAWINGS

FIGS. 2A and 2B are diagrams to show examples of scheduling according to the first embodiment of the present invention;

FIGS. 3A to 3C are diagrams to show examples of an association between k and m and indication information;

FIGS. 5A and 5B are diagrams to show examples of HARQ-ACK transmission method 1;

FIG. 7 is a diagram to show an example of an association between k, m and w and indication information;

DESCRIPTION OF EMBODIMENTS

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of a downlink control channel.

DCI may be scheduling information, including at least one of, for example, data-scheduling time/frequency resources, transport block information, data modulation scheme information, HARQ retransmission information, demodulation RS information, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL, grant." DL assignments and/or UL grants may include information related to the resources, sequences and transmission formats of channels for transmitting UL control signals (UCI (Uplink Control Information)) such as HARQ-ACK feedback in response to DL data, channel measurement information (CSI (Channel State Information)) and so on. In addition, DCI for scheduling UL control signals (UCI (Uplink Control Information)) may be defined apart from DL assignment and UL grants.

Figure 1:
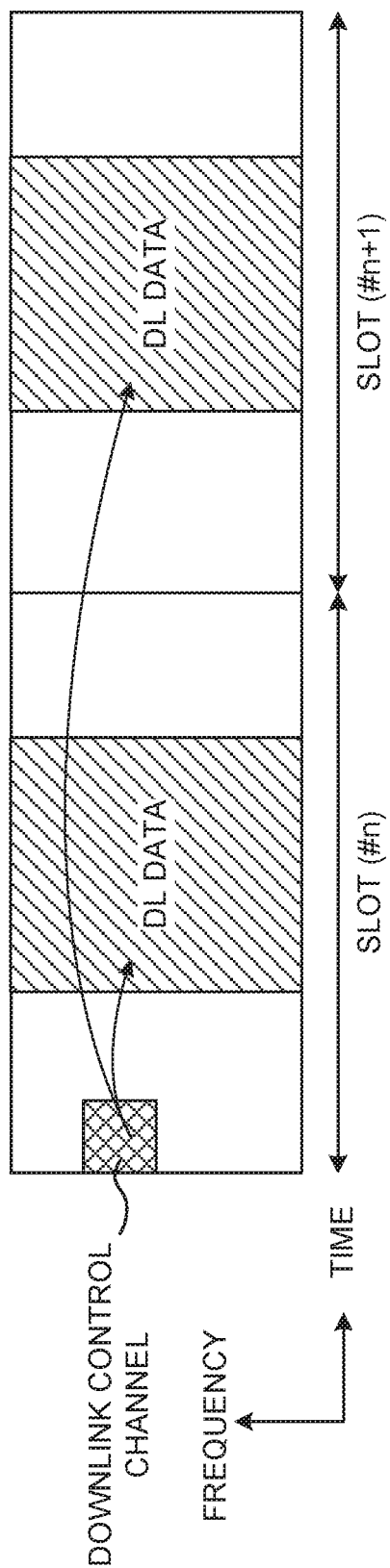
FIG. 1 is a diagram to show an example of cross-slot scheduling.

Also, for future radio communication systems, a study is in progress to use downlink control information, which is transmitted in a given transmission time interval (for example, a slot), to control UL data and/or DL data scheduling in the same slot and/or in different slots (see FIG. 1).

FIG. 2 shows a case where downlink control information (downlink control channel) transmitted in a predetermined slot (#n, in this case) controls scheduling in the predetermined slot (#n) and in another slot (#n+1). The UE controls data transmission and/or receipt in a predetermined slot (#n) and another slot (#n+1) based on downlink control information received in the predetermined slot (#n). Scheduling data in a different slot (here, slot #n+1) by using downlink control information of specific slot (here, slot #n) is also referred to as "cross-slot scheduling." Note that scheduling data of the same particular slot using downlink control information in a particular slot is also referred to as "self-slot scheduling.

When cross-slot scheduling is employed, cases occur where, in slots in which data is scheduled, downlink control information that schedules this data is not necessarily transmitted. In such a case, it is a problem how the UE judges the timing at which DL data is allocated (also referred to as "scheduling timing").

By the way, in future radio communication systems (for example, NR), UEs are likely to have varying processing capabilities. Some UEs may also support signal processing with shorter processing latency.

For example, certain UEs may support self-contained operations. Here, the self-contained operation may indicate, for example, an operation of completing receipt of a specific DL signal (data signal etc.) and transmission (feedback) of a UL signal based on this DL signal (HARQ-ACK etc.) within a specific period (subframe, slot etc.). That is, UEs that support self-contained operations can be assumed to have high processing capabilities.

Therefore, when a UE supporting self-contained operation detects DL assignment for DL data in subframe #n, the UE may transmit HARQ-ACK in response to the DL data in the same subframe #n. Also, when the UE detects a UL grant for UL data in subframe #n, the UE may transmit the UL data in subframe #n.

Meanwhile, another UE may need a longer processing time. This processing time may be different among multiple UEs.

The minimum HARQ processing time at the UE is also referred to as "minimum HARQ processing capability. The HARQ processing time may include the latency from the timing of receiving the DL data to the timing of transmitting the corresponding HARQ-ACK (also called "HARQ-ACK timing"). For example, if the minimum HARQ processing capability for a UE is 3 slots, this UE's time taken from the timing of receiving DL data to the timing of transmitting HARQ-ACK cannot be shorter than 3 slots.

The minimum HARQ processing capability for a UE depends on the processing capability of that UE, the UE may report its own minimum HARQ processing capability to the radio base station.

If the processing capabilities of the UE vary, preferably, the HARQ-ACK timing can be flexibly configured. However, the problem is how the UE judges the HARQ-ACK timing.

Also, in consideration of resource utilization efficiency, it is preferable that the timing of DL data and HARQ-ACK can be changed dynamically. The present inventors came up with the idea of reporting scheduling timing and HARQ-ACK timing to the user terminal using downlink control information.

Now, an embodiment of the present invention will be described in detail below with reference to the accompanying drawings. Note that the radio communication methods according to each embodiment may be applied individually or may be applied in combination. Although cases will be illustrated with the following embodiment where data scheduling is controlled on a per slot basis, other time units can be used likewise (for example, subframes, minislots, subslots, transmission time intervals (TTIs), short TTIs, radio frames, etc.).

(Radio Communication Method)

First Embodiment

The first embodiment of the present invention describes the case where DCI in 1 slot schedules DL data in the same slot or another slot.

For example, as shown in FIG. 2A or FIG. 2B, DCI is transmitted in slot #n, and DL data scheduled by the DCI is transmitted in slot #n+k. Here, k is an integer of 0 or more.

Such scheduling is referred to as "self-slot scheduling" when k is 0 and as "cross-slot scheduling" when k is positive.

The DCI dynamically specifies the value of k, which indicates scheduling timing. Furthermore, the DCI dynamically specifies the value of m which indicates HARQ-ACK timing. As a result, this enables the radio base station to dynamically configure DL data scheduling timing and HARQ-ACK timing in response to the DL data to the user terminal.

«HARQ-ACK Timing Configuration Method»

HARQ-ACK timing configuration methods 1 and 2 will be described, which are examples of HARQ-ACK timing configuration methods.

In HARQ-ACK timing configuration method 1, as shown in FIG. 2A, m is specified by DCI, and HARQ-ACK in response to a slot scheduled by the DCI is transmitted in slot #n+m. That is, HARQ-ACK is transmitted in the m-th slot counting from the slot in which DCI is received.

Here, the UE assumes that m is k or more (m>=k). That is, the slot for transmitting the HARQ-ACK is the same as or later than the slot in which the corresponding DL data is received.

Furthermore, the value of m−k is equal to or greater than the minimum HARQ processing capability of the UE. That is, the time from the last slot to receive DL data based on 1 DCI to the slot to transmit HARQ-ACK in response to the DCI is equal to the time required for the UE to process DL data or longer.

According to HARQ-ACK timing configuration method 1, the radio base station determines the HARQ-ACK timing based on the minimum HARQ processing capability of the UE and the timing when DL data is scheduled (for example, the value of k), so that it is possible to prevent a situation where the UE's receiving process is not in time and fails to receive the next data. In addition, it is possible to flexibly configure the timing of scheduling DL data and the timing of HARQ-ACK.

In HARQ-ACK timing configuration method 2, as shown in FIG. 2B, m is specified by DCI, and HARQ-ACK in response to a slot scheduled by the DCI is transmitted in slot #n+m+k. That is, HARQ-ACK is transmitted in the m-th slot counting from the slot in which DL data is transmitted.

Here, the UE assumes that m is 0 or more (m>=0). That is, the slot for transmitting the HARQ-ACK is the same as or later than the slot in which the corresponding DL data is received.

Furthermore, the value of m is equal to or greater than the minimum HARQ processing capability of the UE. That is, the time from the last slot to receive DL data based on 1 DCI to the slot to transmit HARQ-ACK in response to the DCI is equal to the time required for the UE to process DL data or longer.

Similar to the HARQ-ACK timing configuration method 1, according to the HARQ-ACK timing configuration method 2, it is possible to prevent a situation where the UE's receiving process is not in time and fails to receive the next data. This allows the amount of information reported in HARQ-ACK timing configuration method 2 to be smaller than the amount of information reported in HARQ-ACK timing configuration method 1. This allows the amount of information reported in HARQ-ACK timing configuration method 2 to be smaller than the amount of information reported in HARQ-ACK timing configuration method 1.

«DCI Structure»

Next, DCI structures 1-1 and 1-2, which are examples of DCI structure showing scheduling timing and HARQ-ACK timing, will be described.

In DCI structure 1-1, the DCI separately includes a field for indication information (indicator) A for indicating scheduling timing, and a field for indication information B for indicating HARQ-ACK timing. The value of k may be associated with the value of indication information A, and the value of m may be associated with the value of indication information B. For example, a plurality of candidates for the value of k associated with a plurality of candidates for the value of the indication information A and a plurality of candidates for the value of m associated with a plurality of candidates for the value of the indication information B may be configured by higher layer signaling (for example, RRC (Radio Resource Control) signaling, MAC (Medium Access Control) signaling, etc.).

Figure 4:
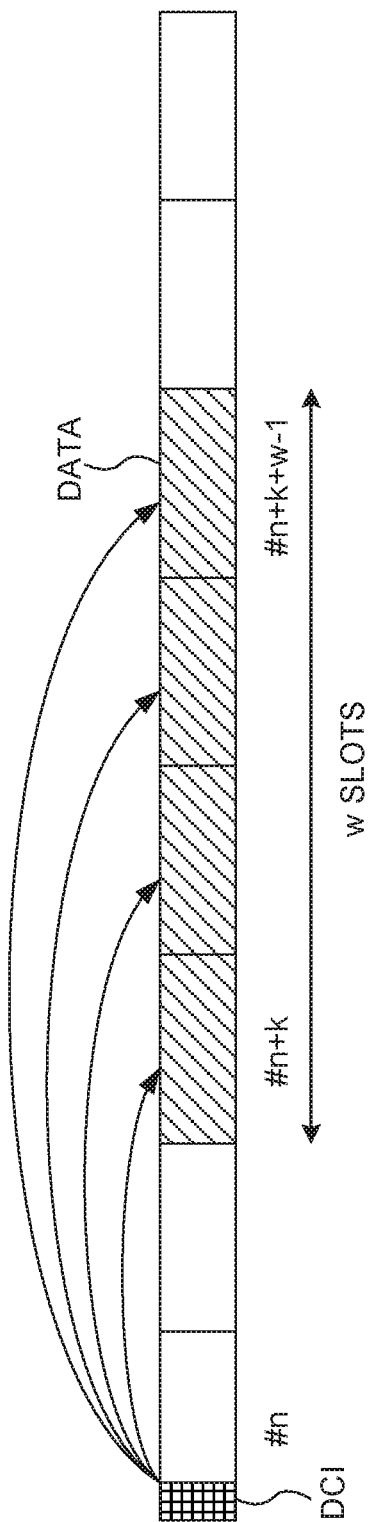
FIG. 4 is a diagram to show an example of cross-slot scheduling.

For example, if the indication information A and B are each a 2-bit field in DCI, each indication information may take 4 values. In this case, 4 values of k associated with the 4 values of indication information A as shown in FIG. 3A and 4 values of m associated with the 4 values of indication information B as shown in FIG. 3B may be configured to the UE through higher layer signaling. Thereafter, the UE may determine the scheduling timing and the HARQ-ACK timing by receiving DCI and identifying k and m respectively associated with the values of indication information A and B.

According to the DCI structure 1-1, scheduling timing and HARQ-ACK timing can be configured independently. For example, HARQ-ACK timing can be configured regardless of changes in scheduling timing.

In the DCI structure 1-2, the DCI includes a field of one indication information C indicating; scheduling timing and HARQ-ACK timing A pair of {k, m} values may be associated with the value of the indication information C. For example, multiple candidates of pairs of {k, m} value associated with multiple candidates of the indication information C may be configured through higher layer signaling.

Figure 8:
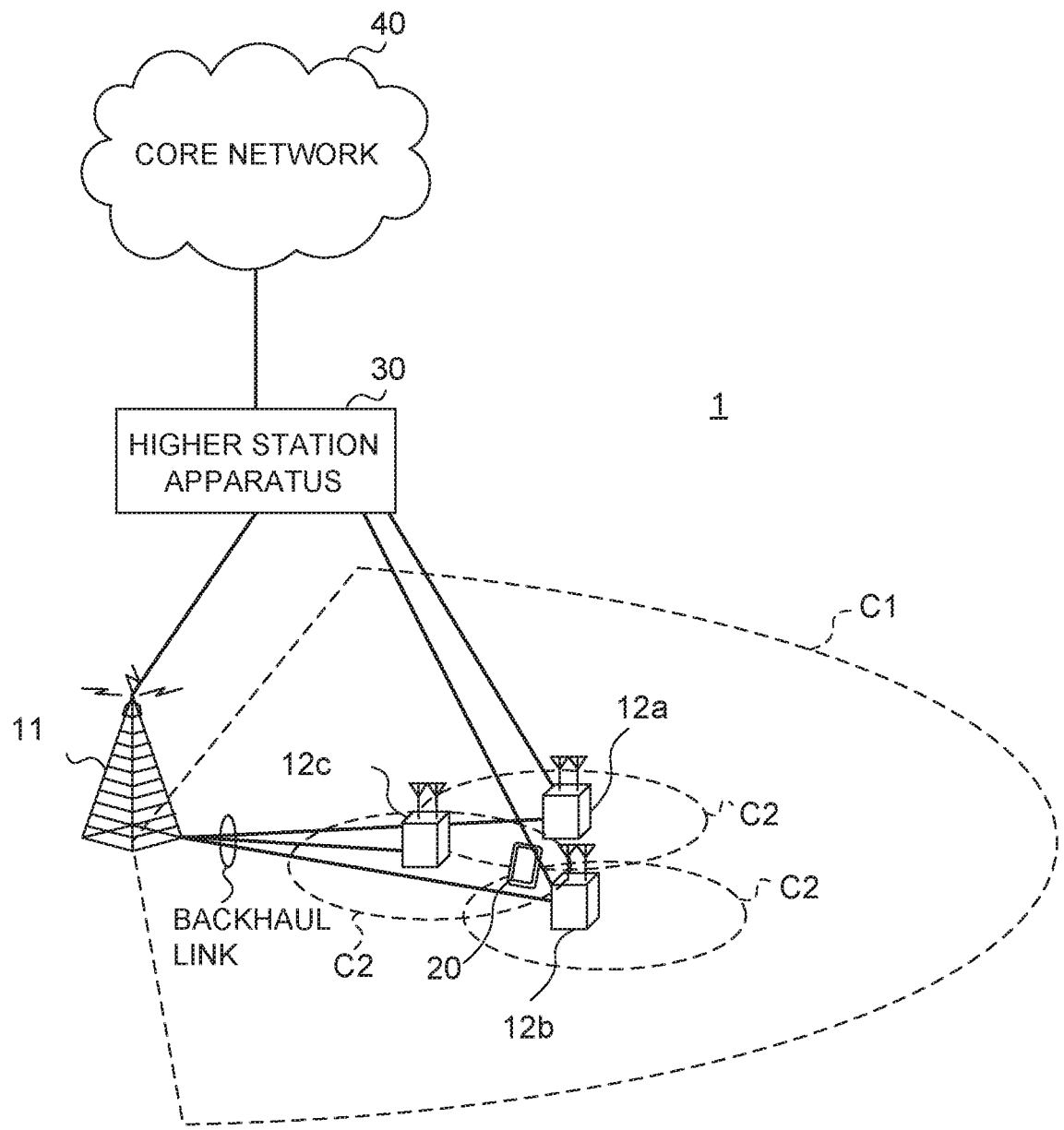
FIG. 8 is a diagram to show an exemplary schematic structure of a radio communication system according to one embodiment of the present invention.

For example, when the indication information C is a 3-bit field, the indication information C may take 8 values. In this case, as shown in FIG. 8 pairs of {k, m} values, each associated to 8 values of the indication information C, may be configured through higher layer signaling. Thereafter, the UE may determine the scheduling timing and the HARQ-ACK timing by receiving DCI and recognizing the values of k and m based on the value of indication information C.

According to DCI structure 1-2, k and m can be configured in one field, so that it is possible to reduce the amount of k and m information dynamically reported from the radio base station to the UE.

Second Embodiment

The second embodiment of the present invention describes the case where DCI in 1 slot schedules DL data in multiple slots. This scheduling is also referred to as "multi-slot scheduling", "slot aggregation."

For example, as shown in FIG. 4, DCI is transmitted in slot #n, and DL data scheduled by the DCI is transmitted in multiple slots from slot #n+k to slot #n+k+w−1. Here, w is an integer of 1 or more.

w indicates the number of slots scheduled by DCI in slot #n. Information related to the base sequence may be configured by higher layer signaling (for example, RRC (Radio Resource Control) signaling or MAC (Medium Access Control) signaling), may be signaled by broadcast information (the MIB (Master Information Block), SIBs (System Information Blocks), etc.), may be indicated by physical layer signaling (for example, downlink control information (DCI)), or may be configured from the network (for example, a radio base station) to a UE by combining these signaling.

A plurality of DL data over w slots may be different transport blocks (TB) with different HARQ processes. In this case, the overhead can be reduced and the data rate can be improved.

A plurality of DL data over w slots may be same transport blocks with same HARQ processes. In this case, a plurality of DL data over w slots may be transport blocks having the same redundancy version, or transport blocks having different redundancy versions. In this case, since the same data is repeatedly transmitted, the coverage can be expanded.

The DCI dynamically specifies the value of k, which indicates scheduling timing. Furthermore, the DCI dynamically specifies the value of m which indicates HARQ-ACK timing. As a result, this enables the radio base station to dynamically configure DL data scheduling timing and HARQ-ACK timing in response to the DL data to the user terminal.

Next, HARQ-ACK transmission methods 1 and 2 will be described, which are examples of method of transmitting HARQ-ACK in response to DL data over multiple slots.

«HARQ-ACK Transmission Method 1 and HARQ-ACK Timing Configuration Method»

In HARQ-ACK transmission method 1, based on higher layer configuration, a plurality of HARQ-ACKs based on 1 DCI are bundled or multiplexed and transmitted in the same slot. For example, when bundling is used, the UE compresses multiple HARQ-ACKs and transmits the compressed information in 1 field in 1 slot. When multiplexing is used, the UE transmits multiple HARQ-ACKs in multiple fields in 1 slot, respectively.

HARQ-ACK Timing Configuration Methods 1-1, 1-2 are described which are examples of HARQ-ACK Timing Configuration Method for HARQ-ACK Transmission Method 1.

In the HARQ-ACK timing configuration method 1-1, as shown in FIG. 5A, m is specified by DCI, HARQ-ACKs in response to multiple slots #n+k, #n+k+1, #n+k+w−1 scheduled by the DCI are transmitted in one slot #n+m. That is, HARQ-ACK is transmitted in the m-th slot counting from the slot in which DCI is received.

Here, the UE assumes that m is k+w−1 or more (m>=k+w−1). That is, the slot for transmitting HARQ-ACK is the same as or later than the last slot for receiving the corresponding DL data.

Furthermore, the value of m−k−w+1 is equal to or greater than the minimum HARQ processing capability of the UE. That is, the time from the last slot to receive DL data based on 1 DCI to the slot to transmit HARQ-ACK in response to the DCI is equal to the time required for the UE to process DL data or longer.

In the HARQ-ACK timing configuration method 1-2, as shown in FIG. 5B, m is specified by DCI, HARQ-ACKs in response to multiple slots #n+k, #n+k+1, . . . , #n+k+w−1 scheduled by the DCI are transmitted in a slot #n+m+k+w−1. That is, HARQ-ACK is transmitted in the m-th slot counting from the last slot in w slots which DL data is received.

Here, the UE assumes that m is 0 or more (m>=0). That is, the slot for transmitting HARQ-ACK is the same as or later than the last slot for receiving the corresponding DL data.

Furthermore, the value of m is equal to or greater than the minimum HARQ processing capability of the UE. That is, the time from the last slot to receive DL data based on 1 DCI to the slot to transmit HARQ-ACK in response to the DCI is equal to the time required for the UE to process DL data or longer.

According to HARQ-ACK transmission method 1 described above, HARQ-ACKs in response to DL data of multiple slots are transmitted in 1 slot, so that the amount of resources to allocate to HARQ-ACKs can be reduced.

«HARQ-ACK Transmission Method 2 and HARQ-ACK Timing Configuration Method»

In HARQ-ACK transmission method 2, a plurality of HARQ-ACKs based on 1 DCI are transmitted in multiple slots respectively. That is, a plurality of HARQ-ACKs respectively corresponding to multiple slots scheduled by 1 DCI are transmitted in different slots.

HARQ-ACK Timing Configuration Methods 2-1, 2-2 are described which are examples of HARQ-ACK Timing Configuration Method for HARQ-ACK Transmission Method 2.

Figure 6A:
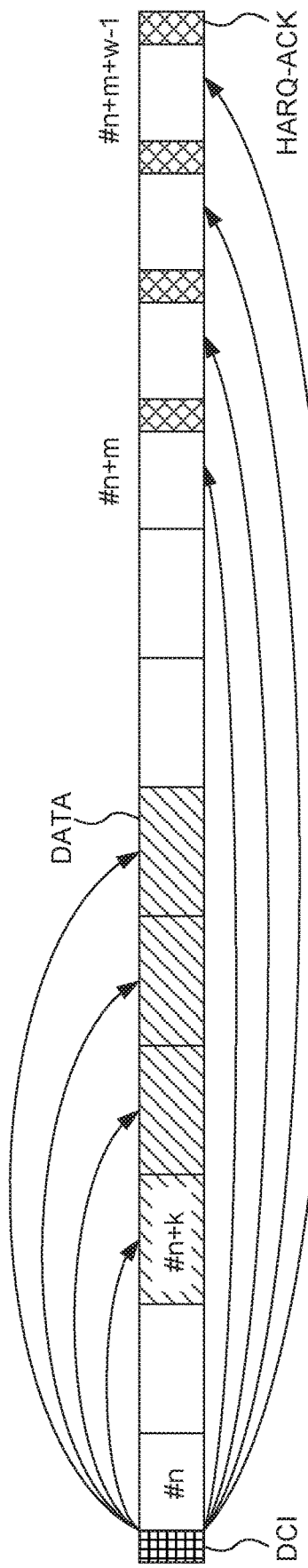
FIGS. 6A and 6B are diagrams to show examples of HARQ-ACK transmission method 2.

In the HARQ-ACK timing configuration method 2-1, as shown in FIG. 6A, m is specified by DCI, HARQ-ACKs in response to multiple slots #n+k, #n+k+1, . . . , #n+k+w−1 scheduled by the DCI are transmitted in multiple slots #n+m, #n+m+1, . . . , #n+m+w−1, respectively. That is, HARQ-ACK is transmitted in the m-th slot counting from the slot in which DL data is received. Also the HARQ-ACK in response to the DL data is transmitted in the m−k th slot counting from the slot in which the DL data is received.

Here, the UE assumes that in is k+w−1 or more (m>=k+w−1). That is, the slot for transmitting HARQ-ACK is the same as or later than the last slot for receiving the corresponding DL data.

Furthermore, the value of m−k−w+1 is equal to or greater than the minimum HARQ processing capability of the UE. That is, the time from the last slot to receive DL data based on 1 DCI to the slot to transmit HARQ-ACK in response to the DCI is equal to the time required for the UE to process DL data or longer.

Figure 6B:
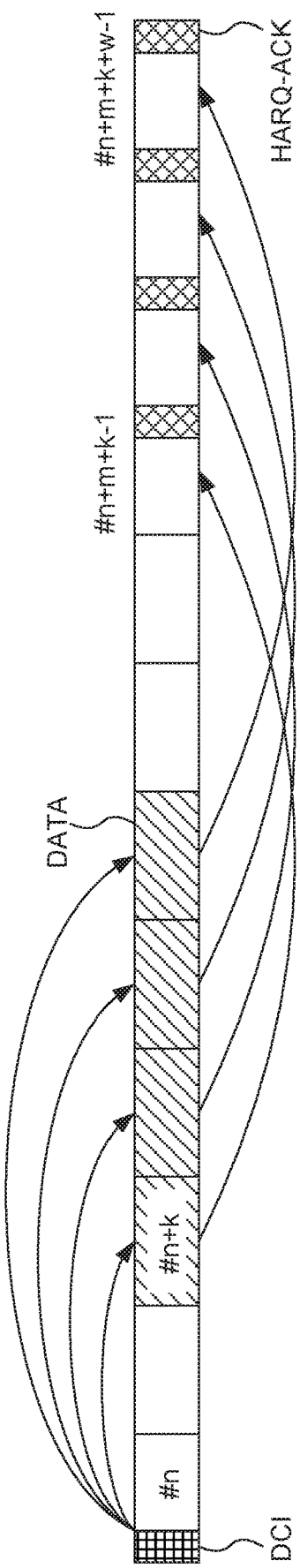

In the HARQ-ACK timing configuration method 2-2, as shown in FIG. 6B, m is specified by DCI, HARQ-ACKs in response to multiple slots #n+k, #n+k+1, . . . , #n+k+w−1 scheduled by the DCI are transmitted in multiple slots #n+m+k, #n+m+k+1, . . . , #n+m+k+w−1, respectively. That is, HARQ-ACK is transmitted in the m-th slot counting from the slot in which DL data is received.

Here, the UE assumes that m is 0 or more (m>=0). That is, the slot for transmitting HARQ-ACK is the same as or later than the last slot for receiving the corresponding DL data.

Furthermore, the value of m−k is equal to or greater than the minimum HARQ processing capability of the UE. That is, the time from the last slot to receive DL, data based on 1 DCI to the slot to transmit HARQ-ACK in response to the DCI is equal to the time required for the UE to process DL data or longer.

According to the above HARQ-ACK transmission method 1, HARQ-ACK timing can be controlled more easily by making the time from each slot in which DL data scheduled by 1 DCI is received to the slot in which the corresponding HARQ-ACK is transmitted constant.

Note that, in FIG. 5 related to HARQ-ACK transmission method 1, HARQ-ACKs in response to all TBs scheduled by the DCI are transmitted at one time, in FIG. 6 related to HARQ-ACK transmission method 2, HARQ-ACKs in response to TBs scheduled by the DCI are transmitted individually, but these examples are by no means limiting. For example, the HARQ-ACKs in response to part of TBs scheduled by the DCI may be bundled or multiplexed and transmitted, and the HARQ-ACKs in response to other TBs may be transmitted individually. TBs that are bundled or multiplexed, and TBs that are not, may be designated by explicit signaling or may be determined based on implicit rules. For example, when the DCI schedules multiple TBs, it is possible to bundle or multiplex and transmit HARQ-ACKs in response to temporally early TBs (close to the time when DCI was detected), and transmit each HARQ-ACKs individually in response to temporally late TBs (far from the time when DCI was detected). In this case, it is easy to reserve the time required to transmit the HARQ-ACK feedback in response to the temporally late TB while reducing the overhead of the HARQ-ACK feedback.

«DCI Structure»

Next, DCI structures 2-2 and 2-3, which are examples of the DCI structure according to the second embodiment, will be described.

Similar to DCI structure 1-1, in DCI structure 2-1, the DCI separately includes a field for indication information A for indicating scheduling timing, and a field for indication information B for indicating HARQ-ACK timing. The value of k may be associated with the value of indication information A, and the value of m may be associated with the value of indication information B. For example, a plurality of candidates for the value of k associated with a plurality of candidates for the value of the indication information A and a plurality of candidates for the value of m associated with a plurality of candidates for the value of the indication information B may be configured through higher layer signaling. The value of w in this case may be configured through higher layer signaling or reported by broadcast information.

For example, if the indication information A and B are each a 2-bit field in DCI, each indication information may take 4 values. In this case, 4 values of k associated with the 4 values of indication information A as shown in FIG. 3A and 4 values of m associated with the 4 values of indication information B as shown in FIG. 3B may be configured to the UE through higher layer signaling. Thereafter, the UE may determine the scheduling timing and the HARQ-ACK timing by receiving DCI and identifying k and m respectively associated with the values of indication information A and B.

According to the DCI structure 2-1, scheduling timing and HARQ-ACK timing can be configured independently. For example, HARQ-ACK timing can be configured regardless of changes in scheduling timing.

Similar to the DCI structure 1-2, in the DCI structure 2-2, the DCI includes a field of one indication information C indicating scheduling timing and HARQ-ACK timing A pair of {k, m} values may be associated with the value of the indication information C. For example, multiple candidates of pairs of {k, m} value associated with multiple candidates of the indication information C may be configured through higher layer signaling.

The value of w in this case may be configured through higher layer signaling or reported by broadcast information.

For example, when the indication information C is a 3-bit field the indication information C may take 8 values. In this case, as shown in FIG. 3C, 8 pairs of {k, m} values, each associated to 8 values of the indication information C, may be configured through higher layer signaling. Thereafter, the UE may determine the scheduling timing and the HARQ-ACK timing by receiving DCI and recognizing the values of k and m based on the value of indication information C.

According to DCI structure 2-2, k and m can be configured in one field, so that it is possible to reduce the amount of k and m information dynamically reported from the radio base station to the UE.

In DCI structure 2-3, DCI includes a field of one indication information D that indicates scheduling timing, HARQ-ACK timing and number of slots scheduled by the DCI. A pair of {k, m, w} values may be associated with the value of the indication information D. For example, multiple candidates of pairs of {k, m, w} value associated with multiple candidates of the indication information D may be configured through higher layer signaling.

For example, when the indication information D is a 3-bit field, the indication information D may take 8 values. In this case, as shown in FIG. 7, 8 pairs of {k, m, w} values, each associated to 8 values of the indication information D, may be configured through higher layer signaling. Thereafter, the UE may determine the scheduling timing and the HARQ-ACK timing by receiving DCI and recognizing the values of k, m and w based on the value of indication information D.

According to DCI structure 2-3, k, m and w can be configured in one field, so that it is possible to reduce the amount of k, m and w information dynamically reported from the radio base station to the UE.

Note that the DCI may include indication information (field) for indicating pairs of k and m and indication information (field) for indicating w. Note that the DCI may include indication information (field) for indicating pairs of k and w and indication information (field) for indicating m. Note that the DCI may include indication information (field) for indicating pairs of m and w and indication information (field) for indicating k.

Note that, the present embodiment shows the case where 1 DCI schedules multiple contiguous slots, but multiple non-contiguous slots may be scheduled. In this case, w may indicate the total number of slots in the period specified by DCI, or the number of slots scheduled (DL data is allocated) in the period specified by DCI. Also, information may be configured to show scheduled slots during the period specified by the DCI. This information may be a slot number showing scheduled slots, or a bit map showing whether or not each slot is scheduled. Also, information may be configured to show not scheduled (DL data is allocated or empty) slots during the period specified by the DCI.

Thus, the UE can use the aforementioned HARQ-ACK transmission methods 1 and 2 even if the DCI schedules multiple non-contiguous slots.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

FIG. 8 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and other radio access schemes may be used as well.

In the radio communication system a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control Channel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PDCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 9:
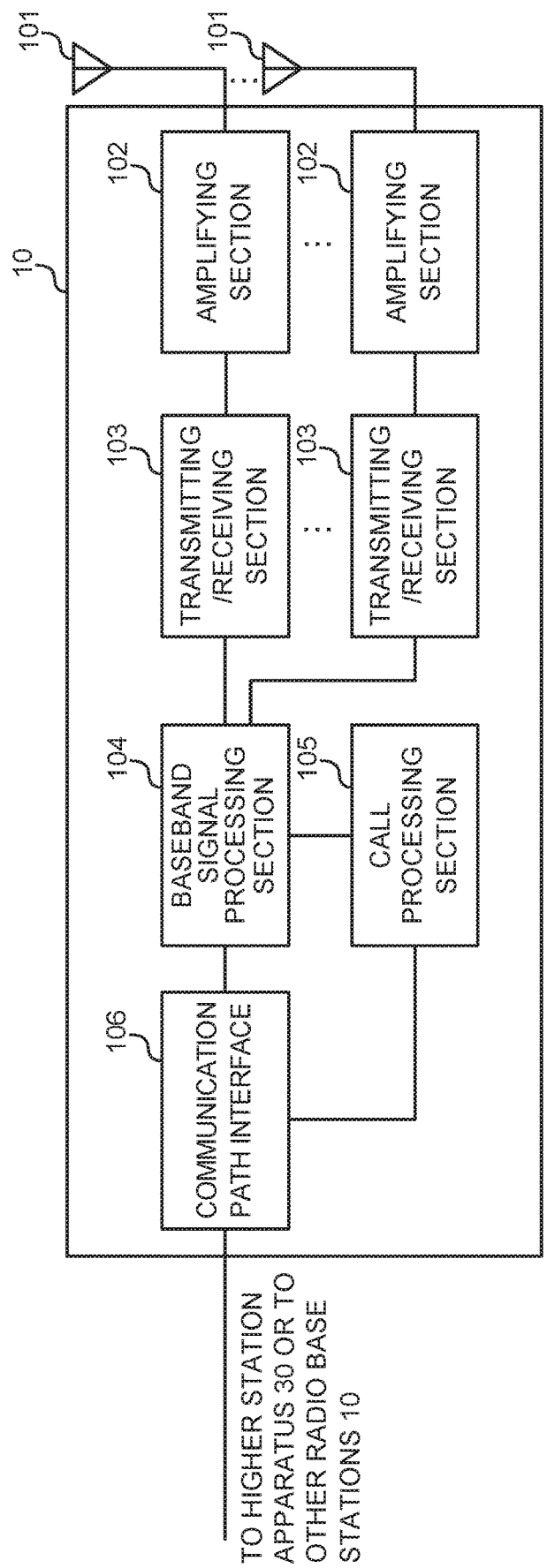
FIG. 9 is a diagram to show an exemplary overall structure of a radio base station according to one embodiment of the present invention.

FIG. 9 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing of communication channels (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving section 103 may transmit, to the user terminal 20, DL control information indicating the relationship between timing at which the user terminal 20 receives DL control information (timing for the radio base station 10 to transmit DL control information), timing at which the user terminal 20 receives DL data (timing for the radio base station 10 to transmit DL data) and timing at which the user terminal 20 transmits the delivery acknowledgment information (for example, HARQ-ACK) (timing at which the radio base station 10 receives the delivery acknowledgment information).

Also, the transmitting/receiving section 103 may transmit the DL data at the timing of transmitting the DL data. In addition, the transmitting/receiving section 103 may receive the relevant delivery acknowledgment information at the timing when the delivery acknowledgment information is received.

Figure 10:
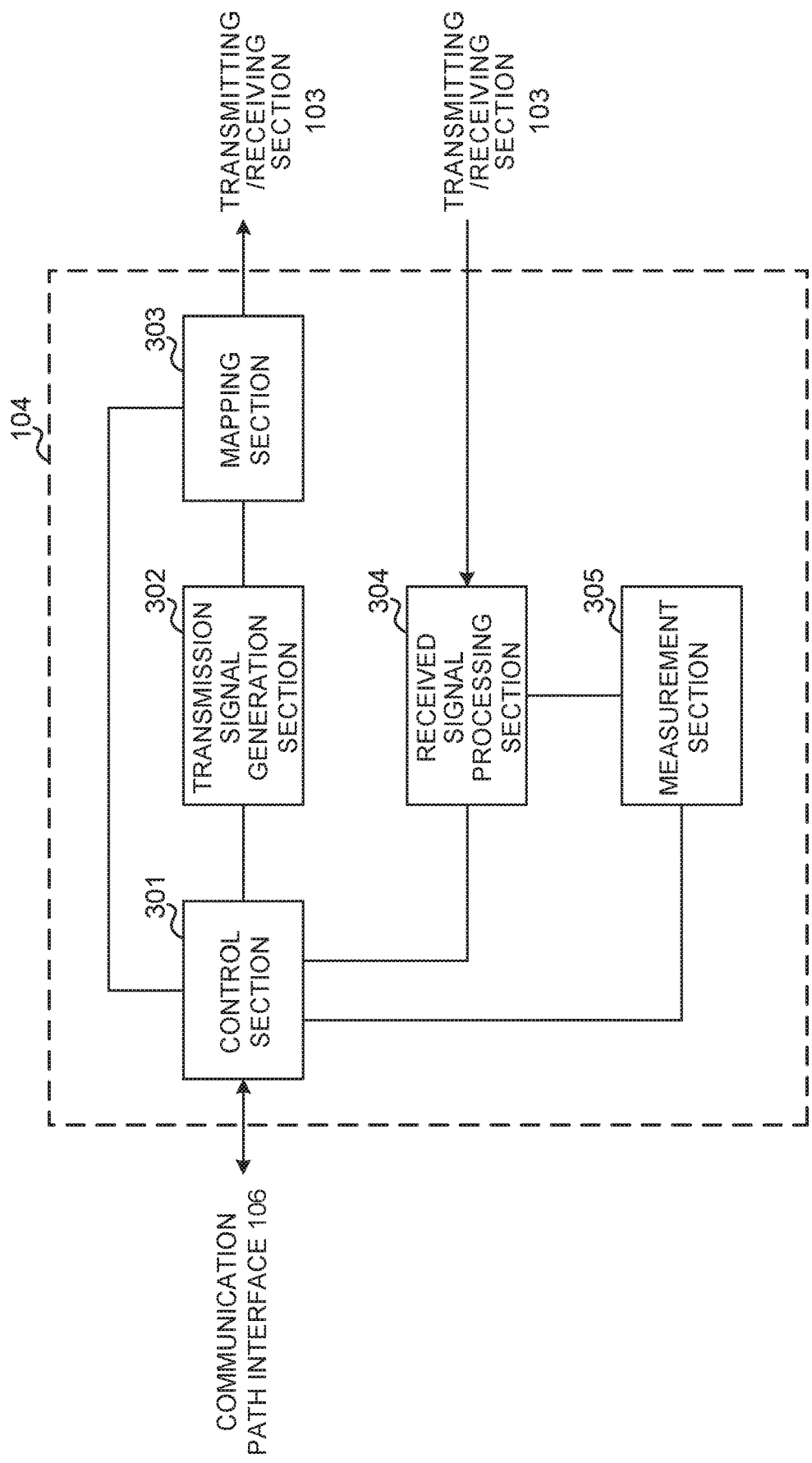
FIG. 10 is a diagram to show an exemplary functional structure of a radio base station according to one embodiment of the present invention.

FIG. 10 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRSs, CSI-RSs, DMRSs and so on) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI formats. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

In addition, the control section 301 may control transmission of DL control information, transmission of DL data, and receipt of delivery acknowledgment information in response to the DL data.

In addition, the control section 301 may schedule DL data, determine the timing of delivery acknowledgment information in response to the DL data, and generate DL control information based on the result.

(User Terminal)

Figure 11:
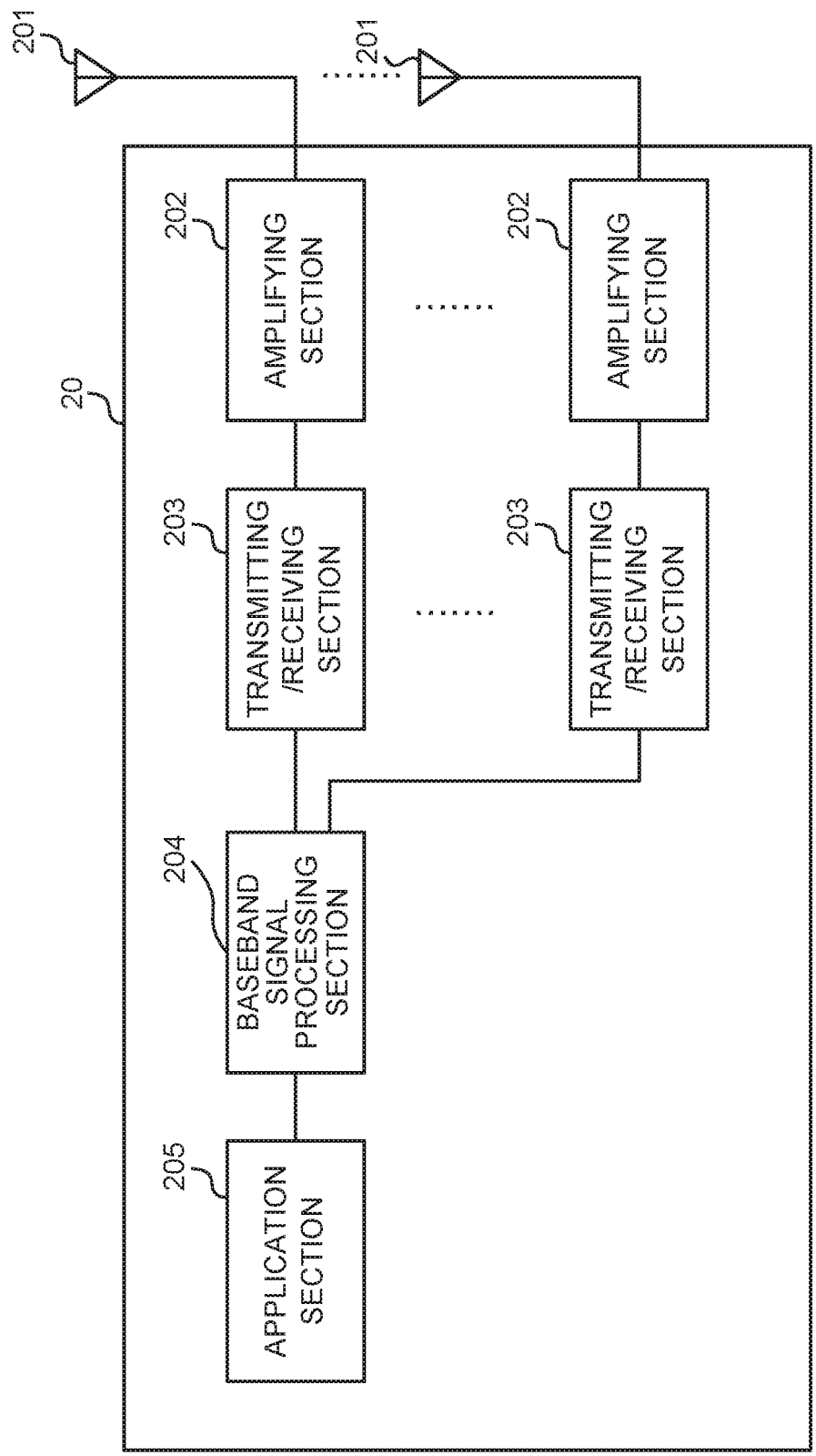
FIG. 11 is a diagram to show an exemplary overall structure of a user terminal according to one embodiment of the present invention.

FIG. 11 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, preceding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving section 203 may receive DL control information. Also, the transmitting/receiving section 203 may receive DL data scheduled by the DL control information. Also, the transmitting/receiving section 203 may transmit delivery acknowledgment information in response to the DL data.

Figure 12:
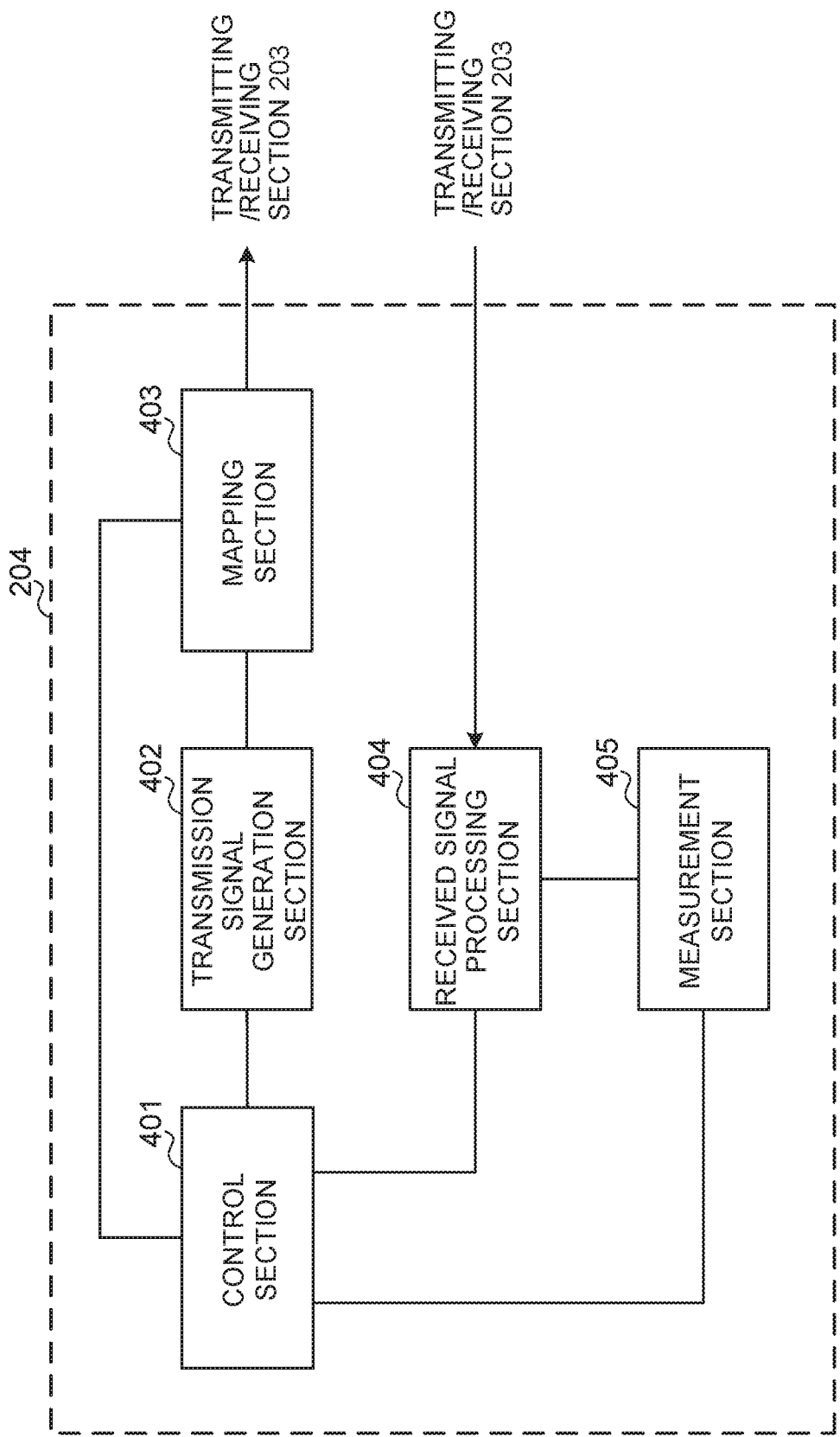
FIG. 12 is a diagram to show an exemplary functional structure of a user terminal according to one embodiment of the present invention.

FIG. 12 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

In addition, the control section 401 may control receipt of DL data scheduled according to DL control information and transmission of delivery acknowledgment information in response to the DL data. The DL control information may indicate a relationship between timing of receiving the DL control information, timing of receiving the DL data, and timing of transmitting the delivery acknowledgment information.

Also, the DL control information may indicate, for each slot, the relationship between the timing of receiving the DL control information, the timing of receiving the DL data, and the timing of transmitting the delivery acknowledgment information.

Also, the DL control information may indicate the relationship between the timing of receiving DL control information (for example, time difference, k) and the timing of receiving DL data and the timing of receiving DL control information and the timing of transmitting delivery acknowledgment information (for example, time difference, m) (for example, HARQ-ACK timing configuration method 1, 1-1 and 2-1). Also, the DL control information may indicate the relationship between the timing of receiving DL control information (for example, time difference, k) and the timing of receiving DL data and the timing of receiving DL control information and the timing of transmitting delivery acknowledgment information (for example, time difference, m) (for example, HARQ-ACK timing configuration method 2, 1-2 and 2-2).

Also, the control section 401 may control receipt of DL data in a slot located after the slot in which DL control information is received.

Also, the control section 401 may exert control, based on DL control information, so that a plurality of DL data are respectively received over multiple slots, and delivery acknowledgment information in response to multiple DL data is transmitted in 1 slot.

Also, the control section 401 may exert control, based on DL control information, so that a plurality of DL data are respectively received over multiple slots, and multiple delivery acknowledgment information is transmitted over multiple slots respectively.

Also, the relationship between the timing of receiving DL data and the timing of transmitting delivery acknowledgment information may be determined based on the information indicating the capability of the user terminal 20.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire and/or wireless, for example) and using these multiple pieces of apparatus.

Figure 13:
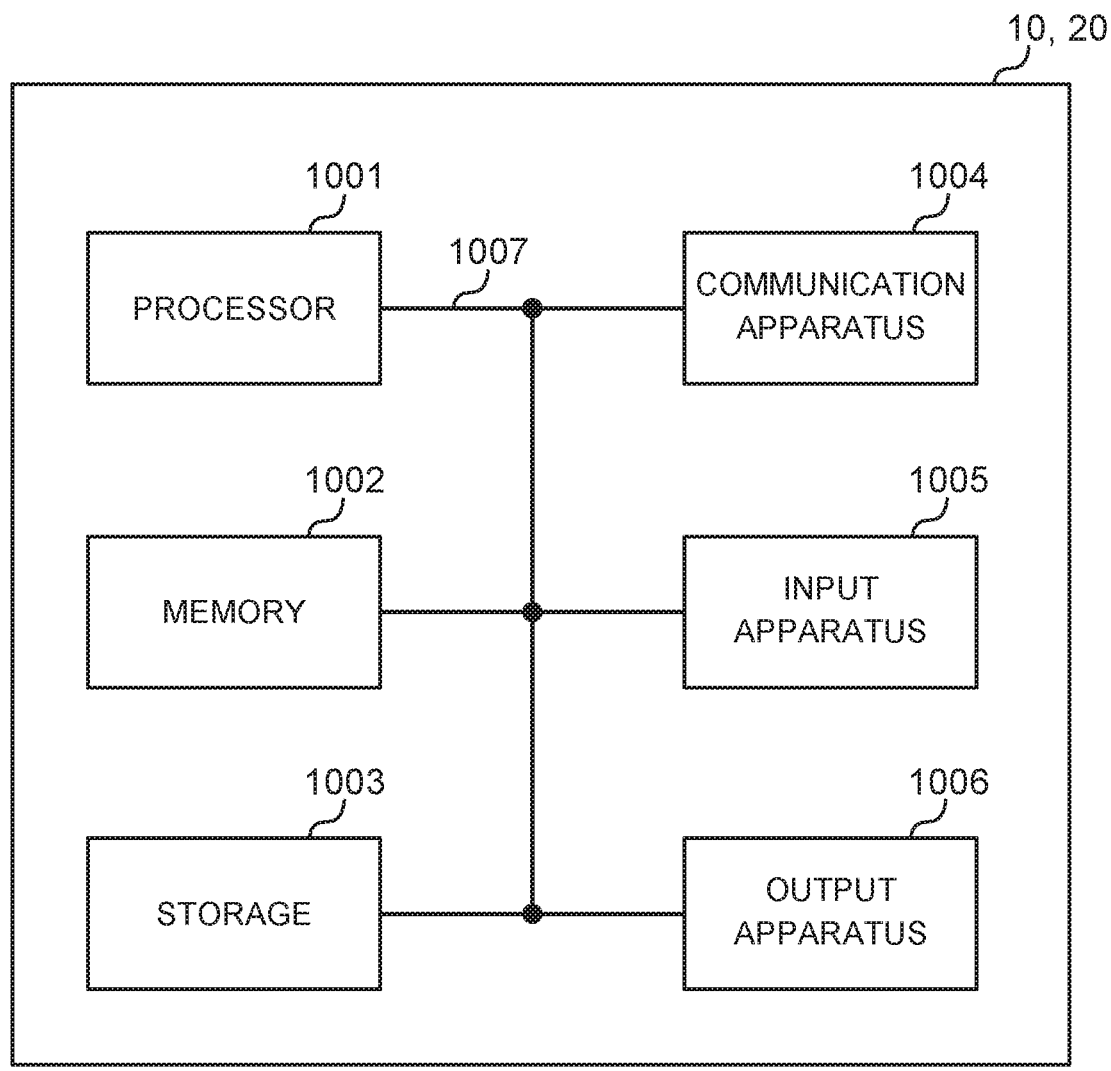
FIG. 13 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 13 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD), For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, one to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a higher layer signaling indicating a third number of consecutive slots for a downlink shared channel, and receives downlink control information for scheduling the downlink shared channel, the downlink control information including a first field that is associated with a first number of slots from an ending slot of downlink shared channel reception to a slot of Hybrid Automatic Repeat reQuest (HARQ)-Acknowledgement (ACK) information transmission for the downlink shared channel, the downlink control information including a second field that is associated with a second number of slots from a slot of downlink control information reception to a slot of the downlink shared channel reception; and
a processor that determines the slot of the downlink shared channel reception based on the second number, and determines the slot for the HARQ-ACK information transmission based on the third number and the first number,
wherein one transport block is repeatedly transmitted in each of the consecutive slots.

2. The terminal according to claim 1, wherein the first field indicates the first number.

3. The terminal according to claim 1, wherein the receiver receives a plurality of values of the first number via higher layer signaling, and the first field indicates one of the plurality of values.

4. The terminal according to claim 1, wherein different redundancy versions are applied to the consecutive slots.

5. The terminal according to claim 1, wherein the processor controls to transmit, in one slot that is the first number of slots after an ending slot of the consecutive slots, HARQ-ACK information for the downlink shared channel reception over the consecutive slots.

6. The terminal according to claim 4, wherein the processor controls to transmit, in one slot that is the first number of slots after an ending slot of the consecutive slots, HARQ-ACK information for the downlink shared channel reception over the consecutive slots.

7. A radio communication method for a terminal, comprising:
receiving a higher layer signaling indicating a third number of consecutive slots for a downlink shared channel and one transport block is repeated in each of the consecutive slots;
receiving downlink control information for scheduling the downlink shared channel, the downlink control information including a first field that is associated with a first number of slots from an ending slot of downlink shared channel reception to a slot of Hybrid Automatic Repeat reQuest (HARQ)-Acknowledgement (ACK) information transmission for the downlink shared channel, the downlink control information including a second field that is associated with a second number of slots from a slot of downlink control information reception to a slot of the downlink shared channel reception;
determining the slot of the downlink shared channel reception based on the second number; and
determining the slot for the HARQ-ACK information transmission based on the third number and the first number.

8. A base station comprising:
a transmitter that transmits a higher layer signaling indicating a third number of consecutive slots for a downlink shared channel, and transmits downlink control information for scheduling the downlink shared channel, the downlink control information including a first field that is associated with a first number of slots from an ending slot of downlink shared channel transmission to a slot of Hybrid Automatic Repeat reQuest (HARQ)-Acknowledgement (ACK) information reception for the downlink shared channel, the downlink control information including a second field that is associated with a second number of slots from a slot of downlink control information transmission to a slot of the downlink shared channel transmission; and
- a processor that determines the slot of the downlink shared channel reception based on the second number, and determines the slot for the HARQ-ACK information transmission based on the third number and the first number,
- wherein one transport block is repeatedly transmitted in each of the consecutive slots.

9. A system comprising:
- a terminal that comprises:
  - a receiver that receives a higher layer signaling indicating a third number of consecutive slots for a downlink shared channel, and receives downlink control information for scheduling the downlink shared channel, the downlink control information including a first field that is associated with a first number of slots from an ending slot of downlink shared channel reception to a slot of Hybrid Automatic Repeat reQuest (HARQ)-Acknowledgement (ACK) information transmission for the downlink shared channel, the downlink control information including a second field that is associated with a second number of slots from a slot of downlink control information reception to a slot of the downlink shared channel reception; and
  - a processor that determines the slot of the downlink shared channel reception based on the second number, and determines the slot for the HARQ-ACK information transmission based on the third number and the first number; and
- a base station that transmits the higher layer signaling and transmits the downlink control information,
- wherein one transport block is repeatedly transmitted in each of the consecutive slots.

* * * * *